(12) United States Patent
Inoue et al.

(10) Patent No.: US 7,008,584 B2
(45) Date of Patent: *Mar. 7, 2006

(54) METHOD FOR FABRICATING A SEAL-INTEGRATED SEPARATOR

(75) Inventors: Masajiro Inoue, Wako (JP); Toshihiko Suenaga, Wako (JP); Nobuaki Kimura, Wako (JP); Keisuke Andou, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 10/010,254

(22) Filed: Dec. 6, 2001

(65) Prior Publication Data

US 2002/0122970 A1  Sep. 5, 2002

(30) Foreign Application Priority Data

Dec. 7, 2000 (JP) .......................... P2000-373418
Nov. 12, 2001 (JP) .......................... P2001-346686

(51) Int. Cl.
*B29C 45/14* (2006.01)
*B29C 33/42* (2006.01)

(52) U.S. Cl. ...................... 264/154; 264/267; 264/273; 264/274; 264/275

(58) Field of Classification Search ................ 264/254, 264/267, 268, 271.1, 273, 274, 275, 138, 264/154; 429/26, 34, 36, 38; 427/115; 29/623.2, 623.4

See application file for complete search history.

(56) References Cited

U.S. PATENT DOCUMENTS 3,619,458 A * 11/1971 Engelhardt .................. 264/260

5,424,144 A * 6/1995 Woods, Jr. .................... 429/35
5,942,347 A * 8/1999 Koncar et al. ................ 429/30
6,057,054 A * 5/2000 Barton et al. ................. 429/42

(Continued)

FOREIGN PATENT DOCUMENTS

JP    60-257528    12/1985

(Continued)

*Primary Examiner*—Angela Ortiz
(74) *Attorney, Agent, or Firm*—Lahive & Cockfield, LLP; Anthony A. Laurentano, Esq.

(57) ABSTRACT

A method for fabricating a seal-integrated separator for a fuel cell is presented, with which seals can be accurately positioned and the assembling time for the fuel cell units may be greatly reduced. The method comprises the steps of: forming a through hole in the separator body; providing a first mold having grooves respectively positioned corresponding to the inner and outer seals disposed on one side of the separator body, a connecting cavity for forming a seal bridge at least partially connecting the inner and outer seals to each other at a position corresponding to the through hole, and at least one gate communicating with each of the grooves, and a second mold having grooves respectively positioned corresponding to the inner and outer seals disposed on the other side of the separator body, and a connecting cavity for forming a seal bridge at least partially connecting the inner and outer seals to each other at a position corresponding to the through hole; holding the separator body between the first mold and the second mold; and injecting melted seal material to form the seals into each of the grooves in the first mold by supplying the melted seal material into the gate and injecting a portion of the melted seal material into each of the grooves in the second mold via the through hole. Through this method, a seal-integrated separator having first to fourth seals which are integrated on both sides of the separator body is fabricated.

5 Claims, 13 Drawing Sheets

U.S. PATENT DOCUMENTS

| | | | |
|---|---|---|---|
| 6,350,538 B1 * | 2/2002 | Wilkinson et al. | 429/32 |
| 6,440,597 B1 * | 8/2002 | Mizuno | 429/34 |
| 6,602,632 B1 * | 8/2003 | Wakahoi et al. | 429/35 |
| 6,649,097 B1 * | 11/2003 | Sasaki et al. | 264/102 |
| 2002/0150810 A1 * | 10/2002 | Mizuno | 429/35 |

FOREIGN PATENT DOCUMENTS

| | | |
|---|---|---|
| JP | 10-252896 | 9/1998 |
| JP | 11-129396 | 5/1999 |
| JP | HEI 11-129396 | 5/1999 |
| JP | HEI 11-179755 | 7/1999 |
| JP | 11-233128 | 8/1999 |
| JP | HEI 11-309746 | 11/1999 |
| JP | HEI 11-309747 | 11/1999 |
| JP | 2000-033630 | 2/2000 |
| JP | 2000-133288 | 5/2000 |

* cited by examiner

METHOD FOR FABRICATING A SEAL-INTEGRATED SEPARATOR

BACKGROUND OF THE INVENTION

1. Field of the Invention

This invention relates to a method for fabricating a seal-integrated separator comprising a separator body for a fuel cell and a seal integrally formed on the separator body.

2. Background Art

Some fuel cell units comprise: a membrane electrode assembly consisting of a solid polymer electrolyte membrane sandwiched between an anode gas diffusion electrode and a cathode gas diffusion electrode; and a pair of separators holding the membrane electrode assembly therebetween.

In a fuel cell of the above type, passages for a fuel gas, e.g., hydrogen, are formed on the anode side separator surface which faces the anode gas diffusion electrode, passages for an oxidizing gas, e.g., oxygen-containing air, are formed on the cathode side separator surface which faces the cathode gas diffusion electrode, and passages for a cooling medium are formed between two separators disposed adjacent to each other.

When the fuel gas is supplied to the reaction surface of the cathode gas diffusion electrode, hydrogen is ionized and moves to the cathode gas diffusion electrode through the solid polymer electrolyte membrane. The electrons generated during this process are sent to an exterior circuit, and used as DC energy. At the cathode gas diffusion electrode provided with the oxidizing gas, water is produced through the reaction of hydrogen ions, electrons, and oxygen. The surface of the separator opposite the diffusion electrode is cooled by means of the cooling medium flowing between the two separators.

Since each of the fuel gas, oxidizing gas, and cooling medium must separately flow through respective passages, seal means are required to separate each of the passages.

For example, seals must be provided: around communication ports which are formed, through a fuel cell stack, to distribute the fuel gas, oxidizing gas, and cooling medium to each fuel cell composing the fuel cell stack; along the outer periphery of the membrane electrode assembly; around the separator surface forming cooling medium passages; and along the outer periphery of both surfaces of the separator. The seal material is preferably selected from compliant materials having the appropriate resilience, such as organic rubber.

SUMMARY OF THE INVENTION

As shown in FIG. 18, a solid polymer electrolyte membrane 2, which is larger than diffusion electrodes 1a and 1b each of which is of the same size, is sandwiched between the diffusion electrodes 1a and 1b, and the outer periphery of the membrane electrode assembly is sealed at a protruding portion 2a, protruding from diffusion electrodes 1a and 1b, of the solid polymer electrolyte membrane 2.

In this type of seal structure, the desired sealing performance will not be properly achieved unless two seals 3a and 3b each of which is disposed on one side of the solid polymer electrolyte membrane 2 are symmetrically located about the solid polymer electrolyte membrane 2.

As shown in FIG. 19, for example, if the two seals 3a and 3b are disposed with a lateral offset with respect to each other as shown in the figure, the area of the solid polymer electrolyte membrane 2 sandwiched between the seals 3a and 3b (hereinafter referred to as "sealed area") is reduced; consequently, the desired sealing performance will not be properly achieved.

As shown in FIG. 20, if the two seals 3a and 3b are not disposed symmetrically about the solid polymer electrolyte membrane 2, but in parallel so that the protruding portion 2a of the solid polymer electrolyte membrane 2 has a step configuration, the seals 3a and 3b form a double seal structure at the protruding portion 2a of the solid polymer electrolyte membrane 2. As a result, the protruding portion 2a has undesirable wrinkles caused by tension in the vertical direction as shown in the figure, and the solid polymer electrolyte membrane 2 is compressed with the wrinkles.

In this case, fluid tends to leak through the wrinkles.

Tension in the protruding portion 2a may degrade the durability of the solid polymer electrolyte membrane 2, and could cause failure thereof in a short period, under repeated changes from hot to cold.

From the foregoing description, in order to prevent excessive stress in the solid polymer electrolyte membrane 2, it is critical to position the seals 3a and 3b with high accuracy when the stacked structure is assembled. Specifically, the thinner the seal width is, the more accurately the seal must be positioned.

As a means to accomplish this, the assembly tolerance in the lateral direction may be increased by making the width of one seal wider than that of the other seal, as shown in FIG. 21.

In this seal structure, although a reduction in the sealed area can be prevented, compressive stress is widely distributed in the wider seal 3c, surface pressure applied by the seal 3c is relatively low, and the sealing performance of the seal 3c is degraded, which is undesirable.

When assembling a fuel cell or a fuel cell stack consisting of stacked fuel cell units, respective seals must be disposed between an anode gas diffusion electrode and an anode side separator, between a cathode gas diffusion electrode and a cathode side separator, and between an anode side separator and a cathode side separator disposed adjacent to each other. Assembling sheet-shaped seals which are not integrated on the separators or coating a paste of the seal material onto the separators requires much time for assembling, and consequently causes an increase in cost during mass production.

Based on the above problems, an object of the present invention is to provide a method for fabricating a seal-integrated separator in which the seals are accurately positioned, and with which the assembling time for the fuel cell units is greatly reduced.

In order to achieve the above object, the method according to the present invention provides the following.

In a first aspect of the present invention, a method for fabricating a seal-integrated separator for a fuel cell, the seal-integrated separator including a separator body (e.g., a cathode side separator body 14a formed by press forming in the embodiments) and an inner seal (e.g., a first seal 41 and a second seal 42) and an outer seal (e.g., a third seal 43 and a fourth seal 44) which are integrated on both sides of the separator body and which are disposed, side by side, around an electrode's reaction surface (e.g., a cathode electrode (25) surface and an anode electrode (27) surface facing a solid polymer electrolyte membrane 18) during use, comprises the steps of: forming a through hole in the separator body (e.g., a through hole 75); providing a first mold (e.g., upper molds 81, 91, 101, 201, and 301) having grooves (e.g., a second groove 92 and a fourth groove 94) respectively positioned corresponding to the inner and outer seals disposed on one side of the separator body, a connecting cavity (e.g., a connecting cavity 96) for forming a seal bridge (e.g., a seal bridge 102) at least partially connecting the inner and outer seals to each other at a position corresponding to the through hole, and at least one gate (e.g., a gate 85a) communicating with each of the grooves, and a second mold (e.g., lower molds 82, 92, 102, 202, and 302) having grooves (e.g., a first groove 91 and a third groove 93) respectively positioned corresponding to the inner and outer seals disposed on the other side of the separator body, and a connecting cavity (e.g., a connecting cavity 95) for forming a seal bridge (e.g., a seal bridge 101) at least partially connecting the inner and outer seals to each other at a position corresponding to the through hole; holding the separator body between the first mold and the second mold; and injecting melted seal material to form the seals into each of the grooves in the first mold by supplying the melted seal material into the gate and injecting a portion of the melted seal material into each of the grooves in the second mold via the through hole.

According to the above method, the seals are simultaneously integrated on both sides of the separator body; thus, the seal-integrated separator can be fabricated through a single process.

As a result, the seals can be accurately positioned and the assembling time of the fuel cell units is greatly reduced, in contrast to the cases in which seals which are not integrated on the separator are positioned relative to both sides of the separator body or a paste of the seal material is coated onto the separator.

In addition, because the seals can be accurately positioned, stresses in the seals are evenly distributed when the separators are stacked.

Furthermore, because the first and second grooves communicate with each other via the through hole, the seal forming pressures applied to both sides of the separator body are equalized to each other when the injection of the melted seal material is completed; thus, deformation in the separator due to uneven seal forming pressures can be preferably prevented.

Additionally, because the through hole is not in the position on the separator body where the seals are to be formed, the compressive force for sealing is not affected by the through hole during use; thus, a local pressure reduction in sealing is preferably prevented.

Furthermore, because the through hole is positioned near the grooves, the injection pressure in a so-called single injection process, i.e., a process in which an injection material is injected into only one of the two mating molds, can be reduced, and also the forming time may be reduced.

In a second aspect of the present invention, the melted seal material is separately supplied into each of the grooves corresponding to the inner and outer seals.

According to the above method, because the melted seal material is evenly supplied into each of the grooves corresponding to the inner and outer seals, the inner and outer seals are uniformly formed; thus, product quality may be preferably improved. In addition, because the melted seal material is separately supplied into each of the grooves, the time for injection can be reduced, and because the flow path of the melted seal material is shortened, the forming time can be reduced.

In a third aspect of the present invention, the gate is connected to a portion of the groove, i.e., the portion (e.g., upper portions 42a and 44a) forming a sealing surface of the seal.

According to the method using the molds with the above structure, supplying the melted seal material to the sealing surface of the seal is ensured, and defects in the product due to insufficient supply of the melted seal material to the sealing surface can be preferably prevented; thus, product reliability may be improved. In addition, because the length of the gate may be shortened, waste of the melted seal material can be reduced.

In a fourth aspect of the present invention, the gate is connected to a portion of the groove, i.e., the portion (i.e., side portions 42b and 44b) not forming a sealing surface of the seal.

According to the method using the molds with the above structure, a supply mark which may degrade the sealing performance will not be made on the sealing surface, which means that improved product quality can be achieved. In addition, because surface finishing of the sealing surface of the seal need not be performed, a relatively low production cost can be achieved.

In a fifth aspect of the present invention, the gate is connected to the connecting cavity.

According to the method using the molds with the above structure, because the melted seal material is supplied into each of the grooves while avoiding the sealing surface, uniform seals can be formed. In addition, because the melted seal material is supplied to portions of the grooves corresponding to the portions of the seals where a compressive force for sealing will not be applied during use, a sufficient sealing performance can be ensured. Furthermore, because the connecting cavity is located between the grooves, enlargement of the molds may be prevented; thus a relatively low production cost can be achieved, in contrast to the case in which the connecting cavity is located outside the grooves.

In a sixth aspect of the present invention, wraparound cavities (e.g., a wraparound cavity 132) are formed in the first and second molds so that the melted seal material flows so as to be supplied via the periphery of the separator body held between the first and second molds.

According to the method using the molds with the above structure, the injection pressure in the grooves in each of the molds may be reduced; thus, the formability of the seals can be improved.

In a seventh aspect of the present invention, the step of holding the separator body between the first mold and the second mold includes supporting at least one side of the separator body by a support fixture (e.g., support fixtures 151 to 154).

According to the above method, deformation of the separator body due to the injection pressure can be preferably prevented when the melted seal material flows through the through hole; thus, accuracy of the product can be improved.

In an eighth aspect of the present invention, a method for fabricating a seal-integrated separator (e.g., a cathode side separator 14 in the embodiments) for a fuel cell, the seal-integrated separator including a separator body (e.g., the cathode side separator body 14a formed by press forming in the embodiments) having a communication port (e.g., an oxidizing gas supply communication port 61a, an oxidizing gas exhaust communication port 61b, a fuel gas supply communication port 62a, a fuel gas exhaust communication port 62b, a cooling medium supply communication port 63a, and a cooling medium exhaust communication port 63b), and seals (e.g., the first to sixth seals 41–45) which are integrated on both sides of the separator body and which are disposed around an electrode's reaction surface (e.g., the cathode electrode (25) surface and the anode electrode (27) surface facing the solid polymer electrolyte membrane 18) during use and around the communication port, comprises the steps of forming a through hole (e.g., the through hole 75) in the separator body; providing a first mold (e.g., the upper molds 81, 91, and 101) having a groove (e.g., the second groove 92, the fourth groove 94, and the sixth groove) positioned corresponding to the seal (e.g., the second seal 42, the fourth seal 44, and the sixth seal) disposed on one side of the separator body, a first gate (e.g., the gate 85*a*) communicating with the groove, and a second gate (e.g., a gate 85*b* and a guide portion 85*c*) separately formed from the first gate so as to directly communicate with the through hole, and a second mold (e.g., the lower molds 82, 92, and 102) having a groove (e.g., the first groove 91, the third groove 95, and the fifth groove) positioned corresponding to the seal (e.g., the first seal 41, the third seal 43, and the fifth seal 45) disposed on the other side of the separator body and communicating with the through hole; holding the separator body between the first mold and the second mold and making the second gate directly communicate with the through hole; and injecting melted seal material to form the seals into the groove in the first mold by supplying the melted seal material into the first gate, and injecting the melted seal material into the groove in the second mold via the through hole by supplying the melted seal material into the second gate.

According to the above method, the melted seal material is directly supplied to the grooves in each of the molds.

In other words, because the melted seal material is supplied into the groove in the second mold without passing through the groove in the first mold, the injection pressure in a single injection process can be reduced, and also the forming time may be reduced.

In a ninth aspect of the present invention, a method for fabricating a seal-integrated separator for a fuel cell, the seal-integrated separator including a separator body and an inner seal and an outer seal which are integrated on both sides of the separator body and which are disposed, side by side, around an electrode's reaction surface during use, comprises the steps of: forming a through hole in the separator body; providing a first mold having grooves respectively positioned corresponding to the inner and outer seals disposed on one side of the separator body, a connecting cavity for forming a seal bridge at least partially connecting the inner and outer seals to each other at a position corresponding to the through hole, a first gate communicating with each of the grooves, and a second gate separately formed from the first gate so as to directly communicate with the through hole, and a second mold having grooves respectively positioned corresponding to the inner and outer seals disposed on the other side of the separator body, and a connecting cavity for forming a seal bridge at least partially connecting the inner and outer seals to each other at a position corresponding to the through hole; holding the separator body between the first mold and the second mold and making the second gate directly communicate with the through hole; and injecting melted seal material to form the seals into the connecting cavity and into each of the grooves in the first mold by supplying the melted seal material into the first gate, and injecting the melted seal material into the connecting cavity and into each of the grooves in the second mold via the through hole by supplying the melted seal material into the second gate.

According to the above method, because the through hole is not in the position on the separator body where the seals are to be formed, the compressive force for sealing is not affected by the through hole during use; thus, a local pressure reduction in sealing is preferably prevented.

In addition, because the through hole is positioned near the grooves, the injection pressure in a so-called single injection process, i.e., a process in which an injection material is injected into only one of the two mating molds, can be reduced, and also the forming time may be reduced.

In a tenth aspect of the present invention, the melted seal material is separately supplied into each of the grooves corresponding to the inner and outer seals.

According to the above method, because the melted seal material is evenly supplied into each of the grooves corresponding to the inner and outer seals, the inner and outer seals are uniformly formed; thus, product quality may be preferably improved. In addition, because the melted seal material is separately supplied into each of the grooves, the time for injection can be reduced, and because the flow path of the melted seal material is shortened, the forming time can be reduced.

In an eleventh aspect of the present invention, the gate is connected to a portion of the groove, i.e., the portion forming a sealing surface of the seal.

According to the method using the molds with the above structure, supplying the melted seal material to the sealing surface of the seal is ensured, and defects in the product due to insufficient supply of the melted seal material to the sealing surface can be preferably prevented; thus, product reliability may be improved. In addition, because the length of the gate may be shortened, waste of the melted seal material can be reduced.

In a twelfth aspect of the present invention, the gate is connected to a portion of the groove, i.e., the portion not forming a sealing surface of the seal.

According to the method using the molds with the above structure, a supply mark which may degrade the sealing performance will not be made on the sealing surface, which means that improved product quality can be achieved. In addition, because surface finishing of the sealing surface of the seal need not be performed, a relatively low production cost can be achieved.

In a thirteenth aspect of the present invention, the step of holding the separator body between the first mold and the second mold includes supporting at least one side of the separator body by a support fixture.

According to the above method, deformation of the separator body due to the injection pressure can be preferably prevented when the melted seal material flows through the through hole; thus, accuracy of the product can be improved.

DETAILED DESCRIPTION OF THE PREFERRED EMBODIMENTS

The preferred embodiments of the present invention will be explained with reference to the accompanying drawings.

Figure 1:
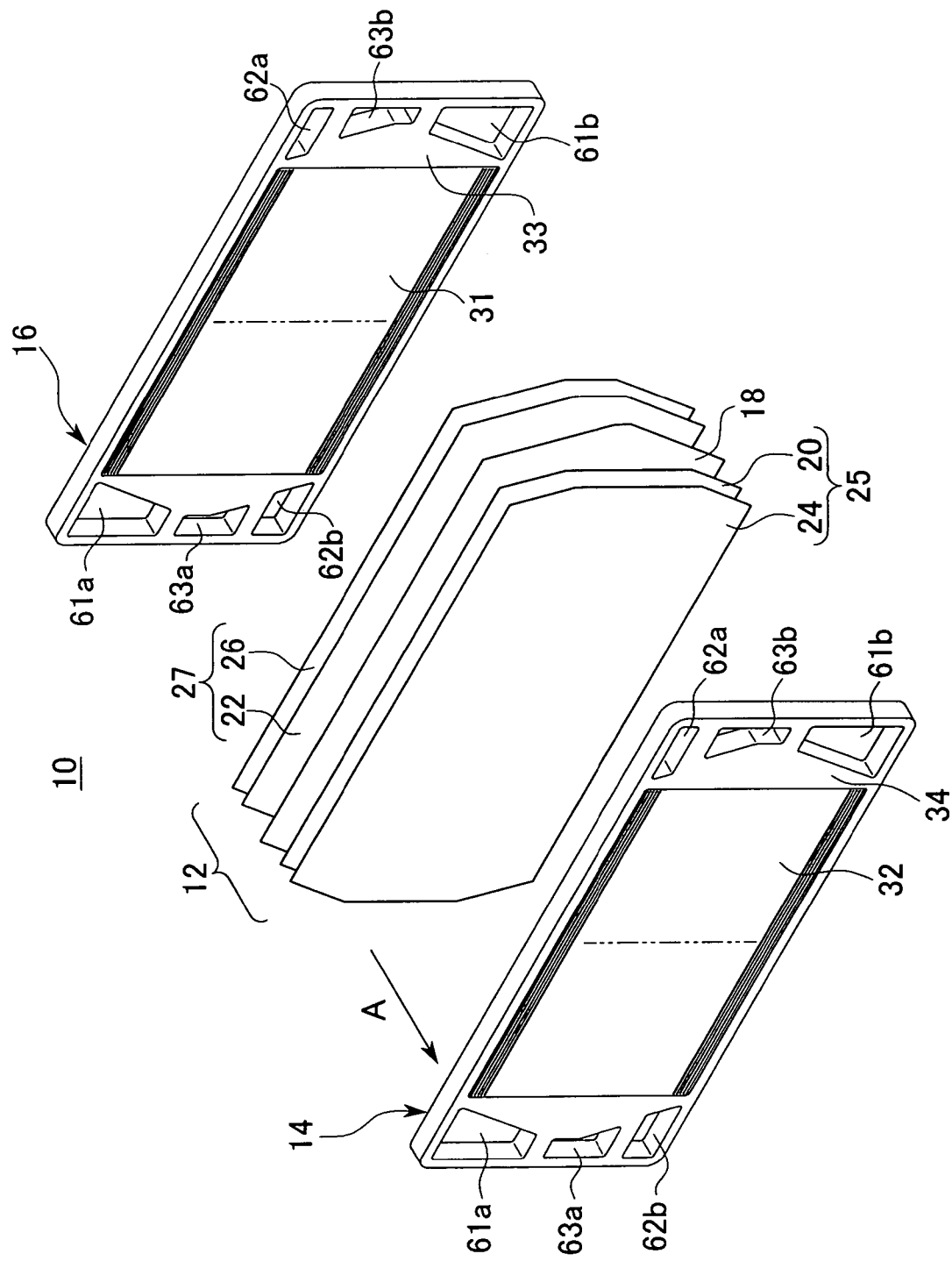
FIG. 1 is an exploded perspective view of a fuel cell comprising seal-integrated separators fabricated through a method according to the present invention.
Figure 2:
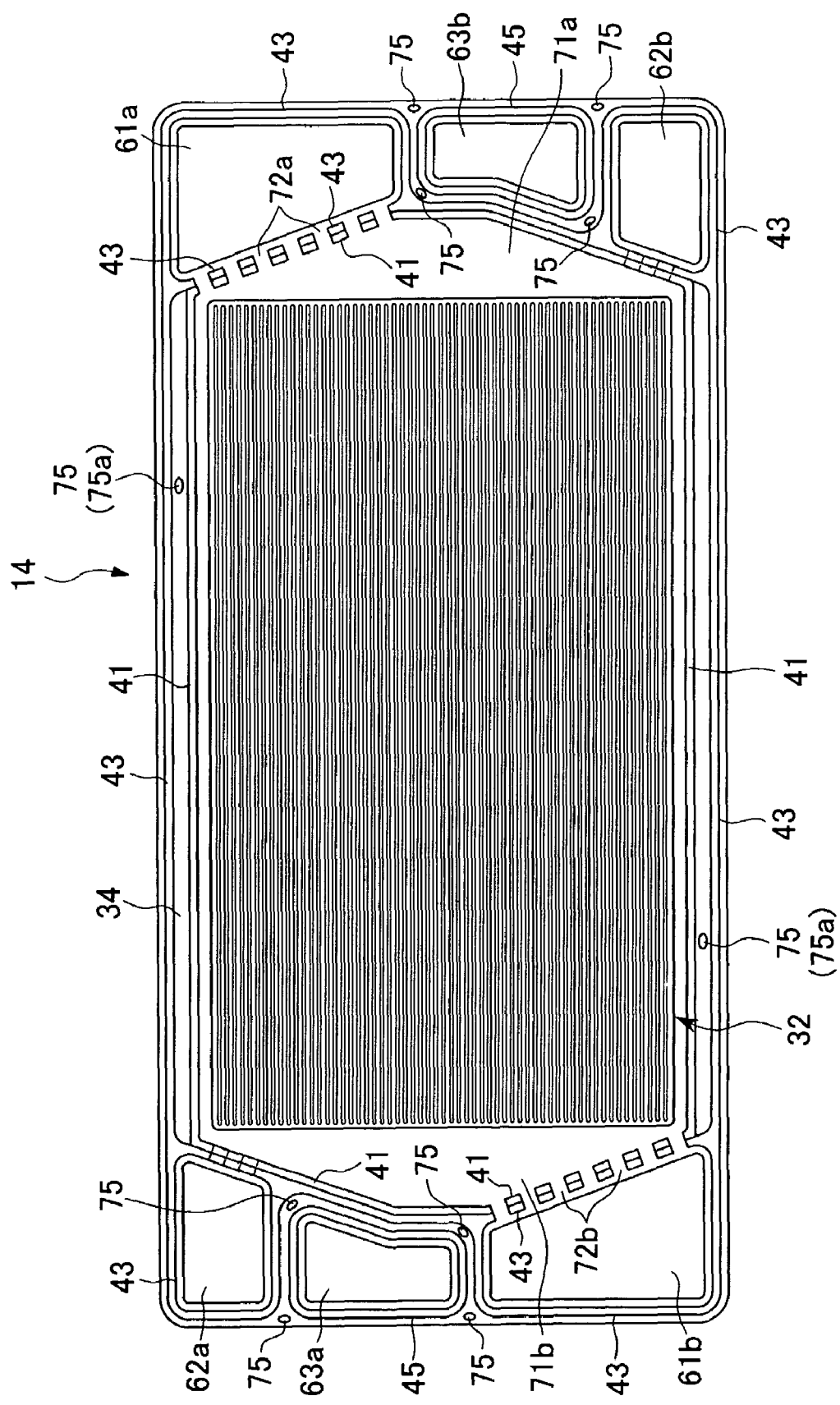
FIG. 2 is an overhead view from the direction indicated by the arrow in FIG. 1.

FIG. 1 is an exploded perspective view of a fuel cell comprising seal-integrated separators fabricated through a method according to the present invention, and FIG. 2 is an overhead view of one of the seal-integrated separators (a cathode side separator 14) shown in FIG. 1 viewed from the direction indicated by the arrow A.

Seals are not shown in FIG. 1.

A fuel cell unit 10 comprises a membrane electrode assembly 12 which is held between the cathode side separator 14 and an anode side separator 16.

A fuel cell stack for vehicles is fabricated by laminating and integrating several sets of the fuel cell unit 10 (e.g., four sets in FIG. 4) by means of fastening elements such as bolts and nuts.

The membrane electrode assembly 12 comprises: a solid polymer electrolyte membrane 18 made of, for example, perfluorosulphonate polymer; a cathode side catalytic layer 20 and an anode side catalytic layer 22 disposed so as to sandwich the solid polymer electrolyte membrane 18; a side catalytic layer cathode side gas diffusion layer 24 disposed at the opposite side of the cathode side catalytic layer 20 with respect to the solid polymer electrolyte membrane 18; and an anode side gas diffusion layer 26 disposed at the opposite side of the anode side catalytic layer 22 with respect to the solid polymer electrolyte membrane 18.

The cathode side catalytic layer 20 and the anode side catalytic layer 22 are made mainly of platinum. The cathode side gas diffusion layer 24 and the anode side gas diffusion layer 26 are made of, for example, porous carbon cloth or porous carbon paper. The cathode side catalytic layer 20 and the cathode side gas diffusion layer 24 together form a cathode electrode 25, and the anode side catalytic layer 22 and the anode side gas diffusion layer 26 together form an anode electrode 27.

The surface of the cathode electrode 25 facing the solid polymer electrolyte membrane 18 and the surface of the anode electrode 27 facing the solid polymer electrolyte membrane 18 each function as a reaction surface.

Figure 3:
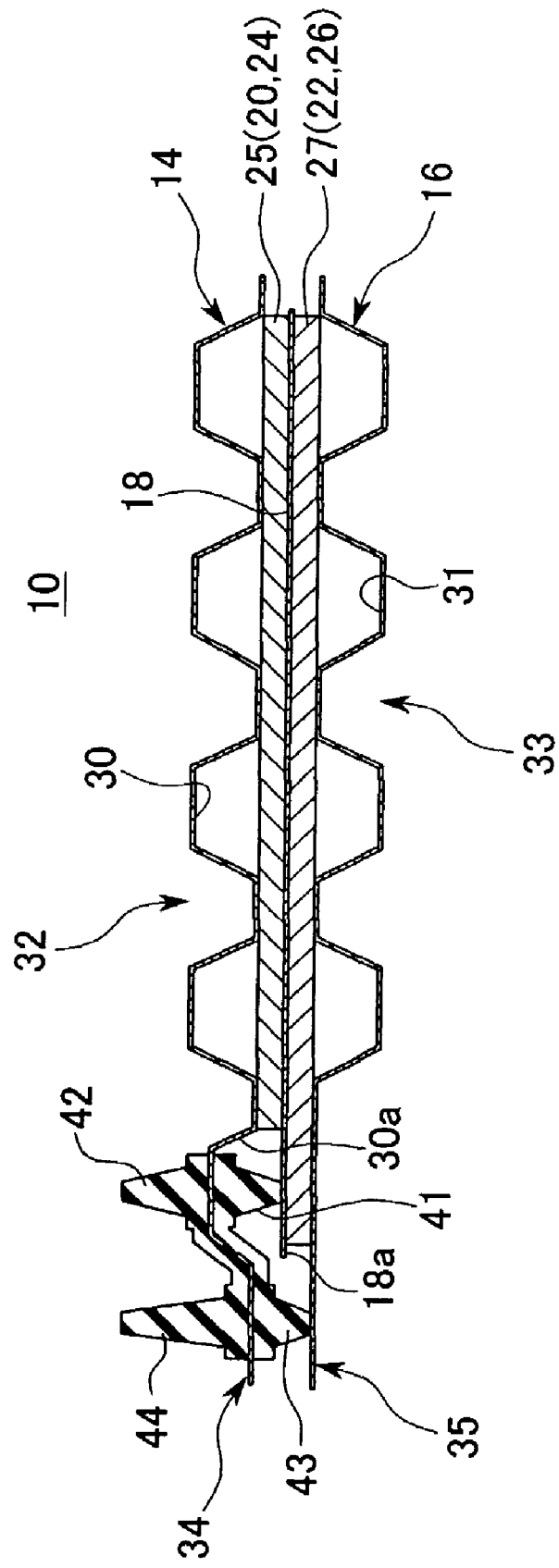
FIG. 3 is a partial cross-section schematically showing the major portion of the fuel cell shown in FIG. 1.
Figure 4:
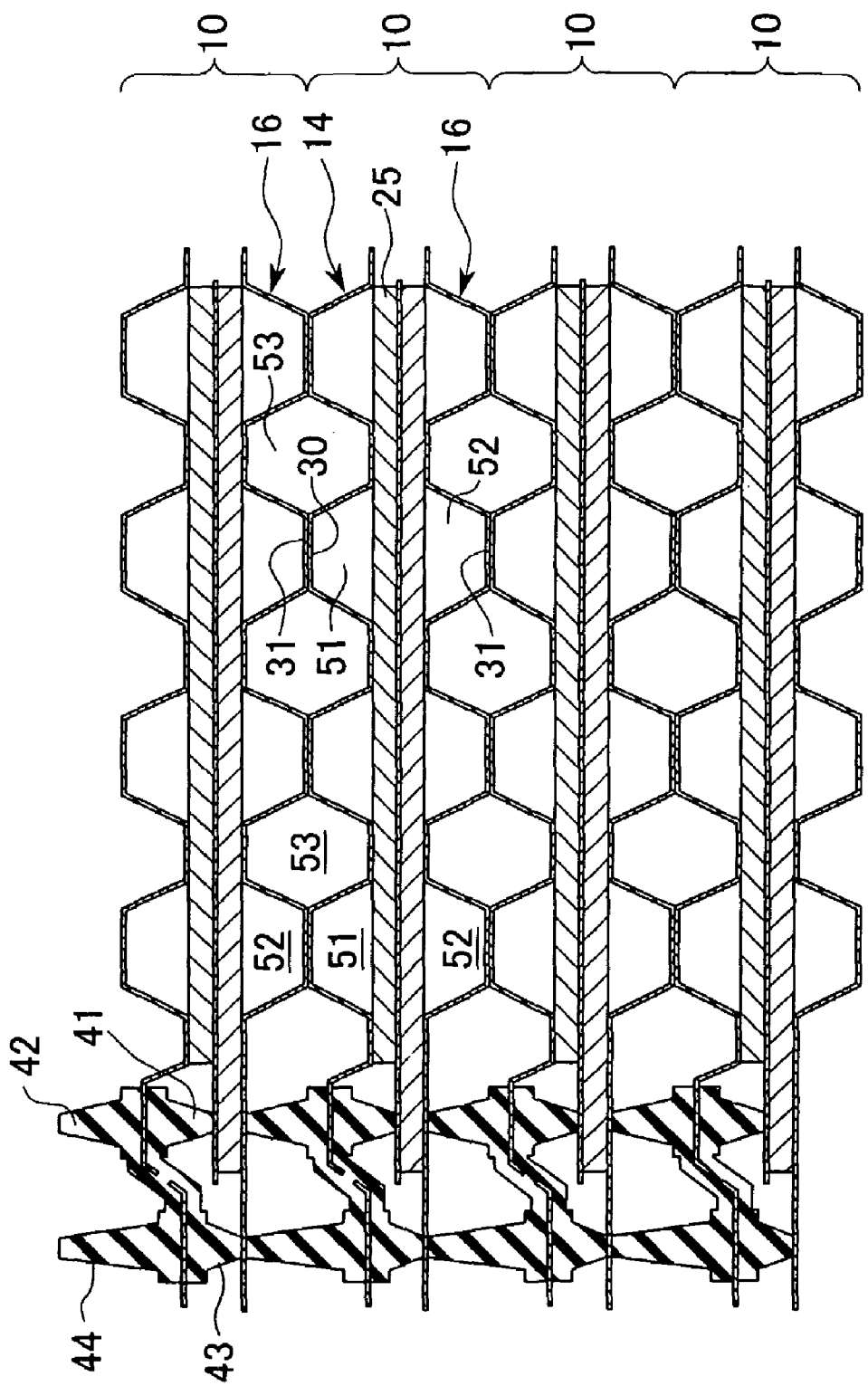
FIG. 4 is a partial cross-section schematically showing the major portion of a fuel cell stack comprising four of the fuel cell units shown in FIG. 1.

FIG. 3 is a partial transverse cross-section of the fuel cell unit 10, and FIG. 4 is a partial transverse cross-section of a fuel cell stack comprising four of the fuel cell units 10 shown in FIG. 3.

As shown in FIG. 3, the solid polymer electrolyte membrane 18 has a protruding portion 18b slightly protruding from the periphery of a set of the cathode side catalytic layer 20 and the cathode side gas diffusion layer 24 and the periphery of a set of the anode side catalytic layer 22 and the anode side gas diffusion layer 26, these sets being disposed so as to sandwich the solid polymer electrolyte membrane 18 therebetween.

The surface area of the set of the anode side catalytic layer 22 and the anode side gas diffusion layer 26 is smaller than that of the solid polymer electrolyte membrane 18, and the surface area of the set of the cathode side catalytic layer 20 and the cathode side gas diffusion layer 24 is smaller than that of the set of the anode side catalytic layer 22 and the anode side gas diffusion layer 26.

The cathode side separator 14 and the anode side separator 16, disposed so as to face the cathode electrode 25 and the anode electrode 27, respectively, are made of stainless steel plates from 0.2 to 0.5 mm thick which are stamped so as to comprise corrugated portions 32 and 33 in which a number of grooves having the same depth are disposed at a constant pitch, and plane portions 34 and 35 which are located outside the corrugated portions 32 and 33, respectively, and which contact each other via a seal 43.

This stamped plate is hereinafter referred to as "separator body".

Figure 5:
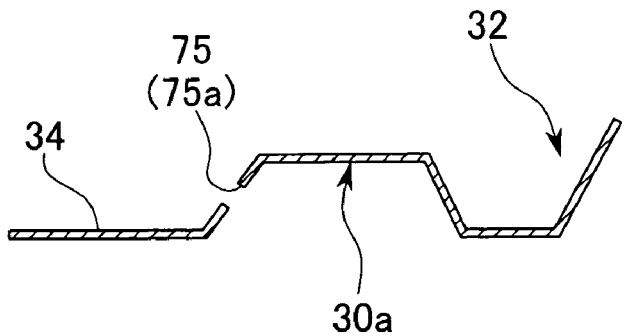
FIG. 5 is a partial cross-section schematically showing the major portion of the separator body.

As shown enlarged in FIGS. 5 and 6, in the cathode side separator 14 as a seal-integrated separator including the separator body 14a, a first seal 41 and a second seal 42, i.e., the inner seals, are integrated on the separator body 14a at corresponding positions on both surfaces of a groove 30a (hereinafter referred to as "outermost groove 30a") located at the outermost position of the corrugated portion 32 of the separator body 14a, and a third seal 43 and a fourth seal 44, i.e., the outer seals, are integrated on the separator body 14a at corresponding positions on both surfaces of the plane portion 34.

An integral fabrication method for the first to fourth seals 41–44, as well as fifth and sixth seals to be discussed below, will later be explained in detail.

In the separator body 14a, a plurality of through holes are made, as shown in FIG. 2, in its press forming process or in the following stamping process.

In this embodiment, these through holes 75 are disposed near the positions where the first to sixth seals 41 to 45 are to be formed. Specifically, a through hole 75a which is positioned outside the long side of the electrode's reaction surface is disposed between the position where the first and second seals 41 and 42, i.e., the inner seals of the dual seals, are to be formed and the position where the third and fourth seals 43 and 44, i.e., the outer seals of the dual seals, are to be formed.

The shapes of the through holes 75 are not limited to an oval shape as shown, and a shape which does not generate excessive resistance to the flow of the melted seal material, such as a circular shape or a rectangular shape, may be used.

The sizes of the through holes 75 may be preferably determined such that a sufficient amount of melted seal material is allowed to flow therethrough so that the melted seal material flows and spreads all around one side of the separator body 14a substantially at the same time as the melted seal material passing through the holes flows and spreads all around the other side thereof.

As shown in FIG. 3, in a single fuel cell unit 10, the first seal 41 is interposed between the front surface (electrode's reaction surface side) of the outermost groove 30a in the cathode side separator 14 and the protruding portion 18b of the solid polymer electrolyte membrane 18; the third seal 43 is interposed between the front surface (electrode's reaction surface side) of the plane portion 34 of the cathode side separator 14 and the front surface (reaction surface side) of the plane portion 35 of the anode side separator 16.

As shown in FIG. 4, in the adjacent fuel cell units 10, the second seal 42 is interposed between the back surface (back side of the electrode's reaction surface) of the outermost groove 30a in the cathode side separator 14 and the back surface (back side of the electrode's reaction surface) of the plane portion 35 of the anode side separator 16; and the fourth seal 44 is interposed between the back surface (back side of the electrode's reaction surface) of the plane portion 34 of the cathode side separator 14 and the back surface (back side of the electrode's reaction surface) of the plane portion 35 of the anode side separator 16.

The back surface of the grooves 30 in the cathode side separator 14 of one fuel cell unit 10 and the surface of the grooves 31 in the anode side separator 16 of another fuel cell unit 10 face each other; thus, spaces having trapezoidal cross-sections are formed between the grooves 30 in the corrugated portion 32 of the cathode side separator 14 and the cathode electrode 25, which are to be used as passages 51 for the oxidizing gas such as an oxygen-containing gas or air.

At the same time, spaces having trapezoidal cross-sections are formed between the grooves 31 in the corrugated portion 33 of the anode side separator 16 and the anode electrode 27, which are to be used as passages 52 for the fuel gas such as a hydrogen-containing gas.

In addition, spaces having hexagonal cross-sections are formed between the grooves 30 in the corrugated portion 32 of the cathode side separator 14 and the grooves 31 in the corrugated portion 33 of the anode side separator 16, which are to be used as passages 53 for the cooling medium such as pure water, ethylene glycol, or oil.

As a matter of convenience for the description, hereinafter, the lateral direction in FIG. 2 is referred to as the horizontal direction, and the up-and-down direction in FIG. 2 is referred to as the vertical direction.

As shown in FIG. 2, in the cathode side separator 14 and within the substantial plane thereof, there are provided: an oxidizing gas supply communication port 61a which allows the oxidizing gas to flow in the upper-right area; a fuel gas supply communication port 62a which allows the fuel gas to flow in the upper-left area; a cooling medium supply communication port 63a which allows the cooling medium to flow in the middle-left area; and a cooling medium exhaust communication port 63b which allows the cooling medium after usage to flow in the middle-right area.

Furthermore, in the cathode side separator 14 and within the substantial plane thereof, there are provided: an oxidizing gas exhaust communication port 61b which allows the oxidizing gas to flow in the lower-left area; and a fuel gas exhaust communication port 62b which allows the fuel gas to flow in the lower-right area, which are located diagonally with respect to the oxidizing gas supply communication port 61a and the fuel gas supply communication port 62a, respectively.

On the surface of the cathode side separator 14, the first seal 41 is formed so as to surround the corrugated portion 32.

The first seal 41 is located so that spaces are formed outside both the right end and the left end, in the horizontal direction of the corrugated portion 32. These spaces respectively function as an oxidizing gas inlet 71a for introducing the oxidizing gas from the oxidizing gas supply communication port 61a into each of the passages 51 for the oxidizing gas, and an oxidizing gas outlet 71b for discharging the oxidizing gas from each of the passages 51 for the oxidizing gas to the oxidizing gas exhaust communication port 61b.

The third seal 43 is formed so as to surround: the first seal 41; the oxidizing gas supply communication port 61a; the fuel gas supply communication port 62a; the oxidizing gas exhaust communication port 61b; and the fuel gas exhaust communication port 62b.

Reference symbol 45 indicates fifth seals which are disposed so as to surround the cooling medium supply communication port 63a and the cooling medium exhaust communication port 63b.

The first seal 41 and the third seal 43 respectively located between the oxidizing gas supply communication port 61a and the oxidizing gas inlet 71a, and between the oxidizing gas exhaust communication port 61b and the oxidizing gas outlet 71b, are discontinuously formed so as to create communication passages 72a to allow communication between the communication port 61a and the inlet 71a through a plurality of passages, and communication passages 72b to allow communication between the communication port 61b and the outlet 71b through a plurality of passages.

On the back surface of the cathode side separator 14, the second seal 42, the fourth seal 44, and the sixth seal, not shown, are respectively formed at symmetrical positions about the separator body 14a with respect to the first seal 41, the third seal 43, and the fifth seal 45 formed on the front surface.

Thus, the first to fourth seals 41–44 surround the reaction surface in a dual manner, and constitute a dual seal structure for the cathode side separator 14, which can preferably prevent loss of the sealing performance due to position shift.

The anode side separator 16 also has communication ports 61a, 62a, 63a, 61b, 62b, and 63b located at respective positions corresponding to the oxidizing gas supply communication port 61a, the fuel gas supply communication port 62a, the cooling medium supply communication port 63a, the oxidizing gas exhaust communication port 61b, the fuel gas exhaust communication port 62b, and the cooling medium exhaust communication port 63b, formed in the cathode side separator 14.

In this embodiment, the first to sixth seals 41–45 are not formed on the anode side separator 16.

The present invention is not limited to this embodiment, and it is acceptable if only the fifth and sixth seals 45 are formed on the anode side separator 16.

Alternatively, if the relationship in size between the cathode electrode 25 and the anode electrode 27 is opposite that in the above embodiment, the first to sixth seals 41–45 may be formed on the anode side separator 16.

Figure 8:
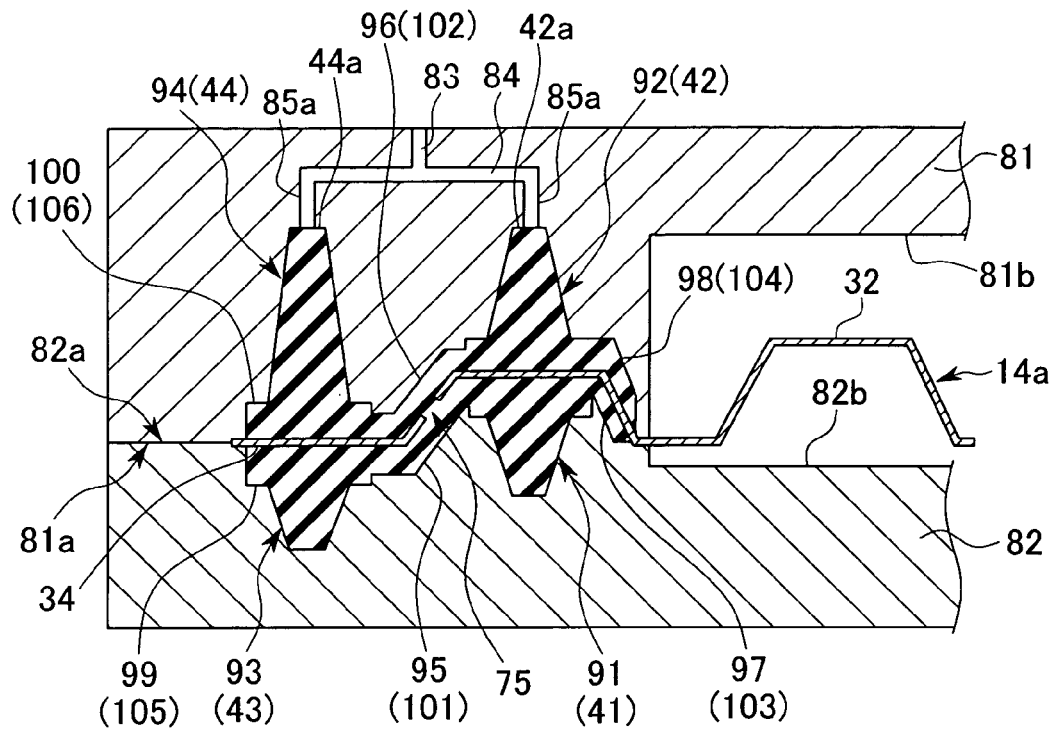
FIG. 8 is a partial cross-section of a first configuration of a metallic mold used in a first embodiment of the present invention.

Referring now to FIG. 8, a first configuration of the injection mold used for fabricating the cathode side separator 14 in the above embodiment will be explained.

Outer periphery portions 81a and 82a in the cavity-defining surfaces of an upper mold 81 (a first mold) and a lower mold 82 (a second mold) are formed with corrugations so as to be able to firmly hold the plane portion 34 and the outermost groove 30a of the separator body 14a, and are provided with first to fourth grooves 91–94 at positions corresponding to the first to fourth seals 41–44 which are to be formed on both sides of the separator body 14a, as well as fifth and sixth grooves (not shown) at positions corresponding to the fifth and sixth seals 45.

In contrast, the central portions in the cavity-defining surfaces of the upper mold 81 and the lower mold 82 are provided with concave portions 81b and 82b so as to accommodate the corrugated portion 32 of the separator body 14a with predetermined clearances with respect to both sides thereof when the cathode side separator 14 is held at the plane portion 34 and the outermost groove 30a by the outer periphery portion 81a of the upper mold 81 and the outer periphery portion 82a of the lower mold 82.

In these metallic molds shown in FIG. 8, there are provided: a connecting cavity 95 for forming a seal bridge 101 connecting the first seal 41 and the third seal 43 on the same side with respect to the separator body 14a; and a connecting cavity 96 for forming a seal bridge 102 connecting the second seal 42 and the fourth seal 44 on the same side with respect to the separator body 14a.

Figure 6:
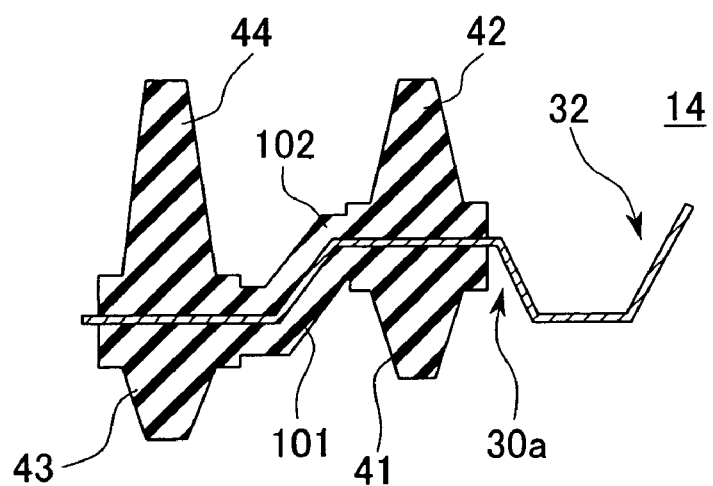
FIG. 6 is a partial cross-section schematically showing the major portion of the cathode side separator.

As shown in FIG. 6, the connecting cavities 95 and 96 are also provided at the positions which do not correspond to the through hole 75 in order to allow the melted seal material to easily flow; therefore, the seal bridges 101 and 102 are also to be formed at these positions.

Figure 7:
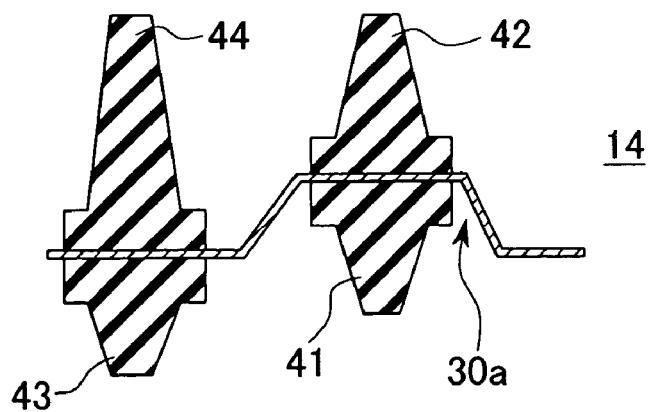
FIG. 7 is a partial cross-section schematically showing the major portion of another embodiment of the cathode side separator.

However, as an alternative configuration, as shown in FIG. 7, the seal bridges 101 and 102 may be omitted at the positions which do not correspond to the through hole 75.

In these molds 81 and 82, there are also provided: backup cavities 97 and 98, located toward the center of the separator from the first and second grooves 91 and 92, to accommodate excess melted seal material and to allow the forming of flash portions 103 and 104; and backup cavities 99 and 100, located toward the peripheral edge of the separator from the third and fourth grooves 93 and 94, to accommodate excess melted seal material and to allow the forming of flash portions 105 and 106.

The upper mold 81 is provided with a sprue 83, a runner 84, and a gate 85 in order to allow the melted seal material supplied from the outside to flow into the second groove 92, the fourth groove 94, and the sixth groove. The gate 85a is connected to portions of the grooves 92 and 94, i.e., the upper portions 42a and 44a forming sealing surfaces of the seals.

Figure 12:
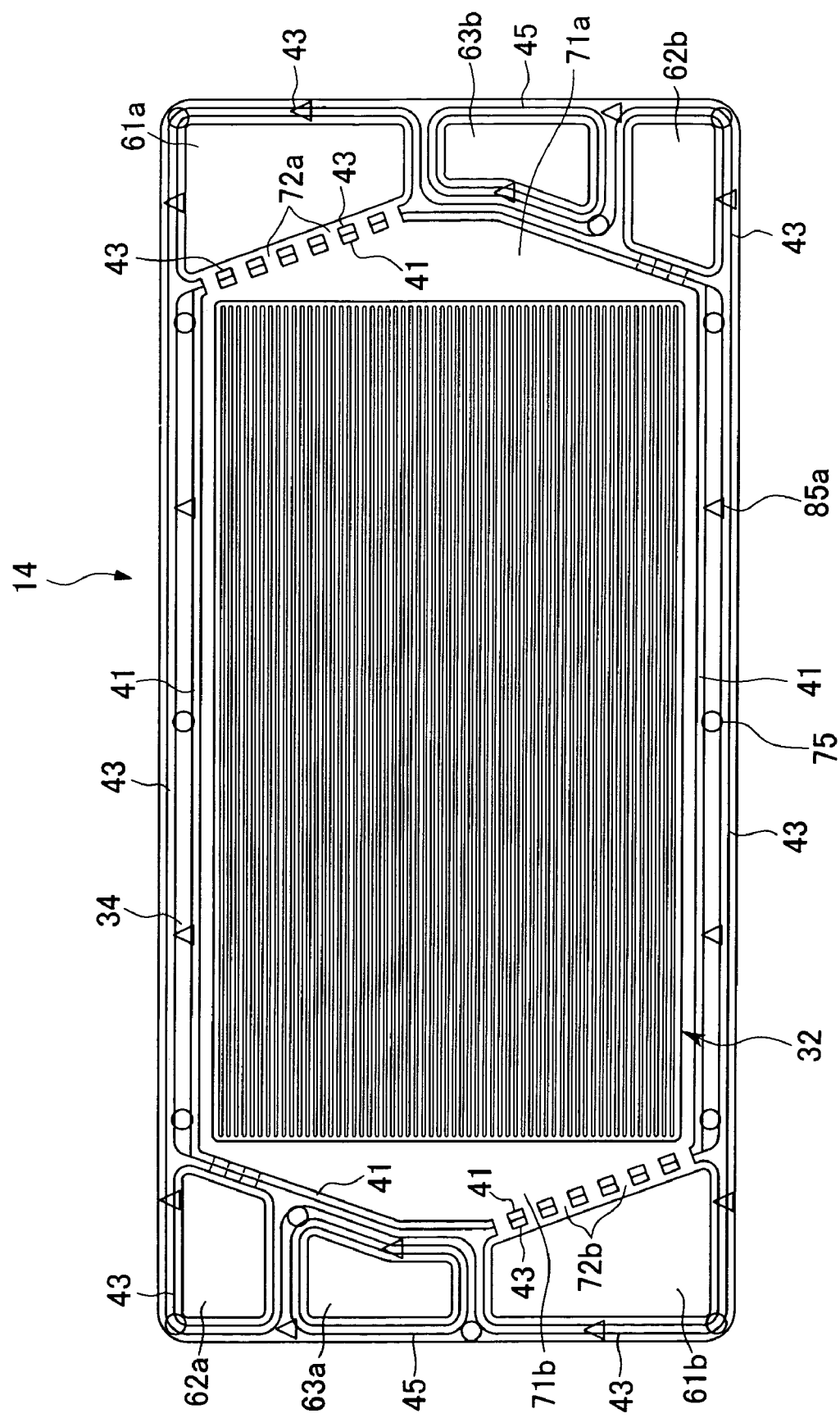
FIG. 12 schematically shows the locations of the gates and the through holes by overlaying them on a plan view of the cathode side separator.

FIG. 12 schematically shows the locations of the gates 85a (indicated by triangular symbols) and the through holes 75 (indicated by circular symbols) by overlaying them on a plan view of the cathode side separator 14.

Many gates 85a are preferred, and the positions thereof are determined so that the melted seal material flows and spreads over both sides of the separator body 14a simultaneously.

A method for fabricating the cathode side separator 14 using the metallic molds shown in FIG. 8 will be explained below. In the following description, only the process to integrate the first to sixth seals 41–45 to the separator body 14a formed by press forming and provided with the through holes 75, which is the main feature of the present invention, will be explained.

The description about the formation of the fifth seal 45 and the sixth seal will be simplified since the fifth and sixth grooves are not shown in FIG. 8.

First, the plane portion 34 and the outermost groove 30a of the separator body 14a are placed on the outer periphery portion 82a in the cavity defining surface of the lower mold 82; then, the upper mold 81 and the lower mold 82 are closed together.

Through this process, the separator body 14a is held by the upper mold 81 and the lower mold 82, and molding cavities are formed in both sides of the plane portion 34 and in both sides of the outermost groove 30a of the separator body 14a.

Then, the melted seal material is injected into the sprue 83 of the upper mold 81, and is supplied into the second groove 92, the fourth groove 94, and the sixth groove through the runner 84 and the gate 85a.

Injection molding is performed under the following conditions:
injection pressure (kg/cm$^2$): 80–120;
mold temperature (° C.): 200;
forming time (min.): 3;
mold closing pressure (tons): 35; and
seal material: silicone rubber with a hardness of 50°.

For the seal material, an elastomeric material, e.g., a thermal curing type rubber, thermosetting type liquid seal material, etc., which requires thermal curing or thermosetting, or a thermoplastic elastomer or cold setting type liquid seal material, which does not require heating, may be used.

A portion of the melted seal material supplied into the second and fourth grooves flows into the connecting cavity 96 and the backup cavities 98 and 100 all of which are formed on the back side of the separator body 14a, and another portion of the melted seal material flows toward the front side of the separator body 14a via the through hole 75, flows into the connecting cavity 95, and then flows into the first and third grooves 91 and 93, and the backup cavities 97 and 99.

Similarly, the melted seal material is also supplied into the sixth groove through the gate (not shown) extending downwardly from the runner 84, and a portion the melted seal material flows to the front side of the separator body 14a via the through hole 75, and flows into the fifth groove.

Upon completion of forming, the molds are opened to obtain the cathode side separator 14 of seal-integrated type having the first to sixth seals 41–45 integrated on both sides of the plane portion 34 and to both sides of the outermost groove 30a of the separator body 14a.

In accordance with this fabrication method, the first to sixth seals 41–45 are simultaneously integrated on both sides of the separator body 14a; therefore, the seals 41–45 are precisely positioned at symmetrical positions about the separator body 14a, and the sealing performance can be improved.

In addition, because the seals can be accurately positioned, stresses in the seals are evenly distributed when the separators are stacked.

Furthermore, because the first and second grooves communicate with each other via the through hole, the seal forming pressures applied to both sides of the separator body are equalized to each other when the injection of the melted seal material is completed; thus, deformation in the separator due to uneven seal forming pressures can be preferably prevented.

Additionally, because the through hole is not in the position on the separator body where the seals are to be formed, the compressive force for sealing is not affected by the through hole during use; thus, a local pressure reduction in sealing is preferably prevented.

In addition, the cathode side separator 14 of seal-integrated type may be fabricated through a single process; thus, the assembling time of the fuel cell unit 10 as well as the assembling time of a fuel cell stack to be formed by laminating a plurality of fuel cell units 10 can be greatly reduced; consequently, an increase in production cost is preferably avoided, which is partially achieved by a single injection process.

Furthermore, in the case of forming a fuel cell stack, seals are not required for the anode side separators 16, and only one kind of metallic mold for injection is required in order to fabricate the cathode side separators 14 since the disposition of the seals on the cathode side separators 14 are unified; therefore, a further cost reduction in production may be achieved.

In this embodiment, the first groove 91 and the third groove 93, which are located on one side of the separator body 14a, are connected by the connecting cavity 95 for forming the seal bridge 101, and the second groove 92 and the fourth groove 94, which are located on the other side of the separator body 14a, are connected by the connecting cavity 96, for forming the seal bridge 102; thus, the tolerance required for the excessively supplied melted seal material may be moderated.

In addition, the first to fourth seals 41–44 more firmly adhere to the separator body 14a by means of the seal bridges 101 and 102; therefore, separation of the first to fourth seals 41–44 from the separator body 14a, which could occur when the seal-integrated separator is removed from the molds, can be preferably prevented.

Furthermore, a short circuit between the cathode side separator 14 and the anode side separator 16, which are positioned adjacent to each other in an assembled fuel cell stack, or a short circuit due to water condensation, can be preferably prevented since the seal bridges 101 and 102 also function as an insulation layer.

In addition, because the gate 85a is connected to the upper portions 42a and 44a of the grooves 92 and 94, which will form sealing surfaces of the seals, supplying the melted seal material to the sealing surface of the seal is ensured, and defects in the product due to an insufficient supply of the melted seal material to the sealing surface can be preferably prevented; thus, product reliability may be improved. Furthermore, because the length of the gate 85a may be shortened, waste of the melted seal material can be reduced.

Additionally, because the melted seal material is evenly supplied into each of the grooves 92 and 94 corresponding to the inner and outer seals from each of the gates 85a, the inner and outer seals 41 to 44 are uniformly formed; thus, product quality may be preferably improved. Furthermore, because the melted seal material is separately supplied into each of the grooves 92 and 94, the time for injection can be reduced, and because the flow path of the melted seal material is shortened, the forming time can be reduced.

Figure 9:
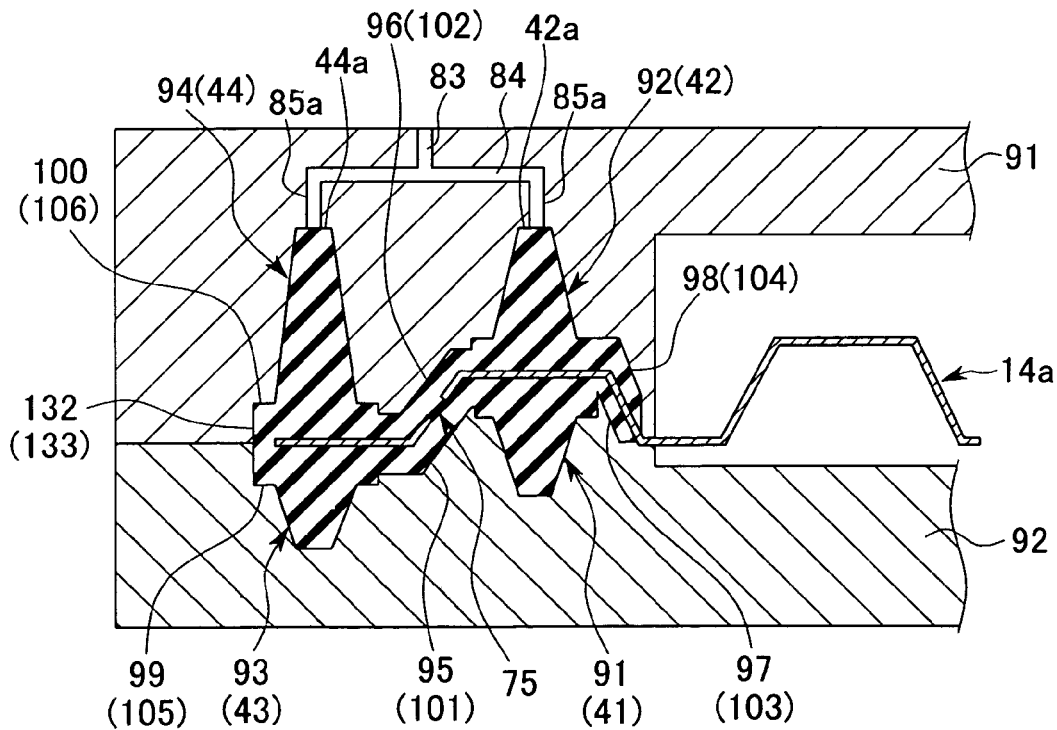
FIG. 9 is a partial cross-section of another configuration of the metallic mold used in the first embodiment of the present invention.

Referring now to FIG. 9 and primarily comparing the difference from FIG. 5, a second configuration of the injection mold used for fabricating the cathode side separator 14 will be explained.

In FIG. 9, the same reference symbols are used for the same elements as in FIG. 8.

In the metallic mold shown in FIG. 9, wraparound cavities 132 are formed in the first and second molds so that the melted seal material flows so as to be supplied via the periphery of the separator body 14a held between the first and second molds, and forms a wraparound seal 133.

In this configuration, the melted seal material is injected into the sprue 83 in the upper mold 91, and is supplied into the second groove 92, the fourth groove 94, and the sixth groove via the runner 84 and the gates 85 in the upper mold 91.

A portion of the melted seal material supplied into the grooves 92 and 94 flows into the connecting cavity 96 and the backup cavities 98 and 100, all of which are formed in the back side of the separator body 14a.

Furthermore, a portion of the melted seal material injected into the connecting cavity 96 and the backup cavities 98 and 100 flows toward the front side of the separator body 14a via the wraparound cavity 132 or via the through hole 75, and flows into the connecting cavity 95, the backup cavities 97 and 99, the first groove 91, and the third groove 93.

Similarly, the melted seal material is also supplied into the sixth groove through the gate (not shown) extending downwardly from the runner 84, and a portion of the melted seal material flows to the front side of the separator body 14a via the through hole 75, and flows into the fifth groove.

According to the method using the molds with the above structure, because the melted seal material is also supplied toward the front side of the separator body 14a via the wraparound cavity 132, the injection pressure may be reduced.

Accordingly, the formability of the first to sixth seals 41–45 may be improved as compared with the case of the first configuration of the mold shown in FIG. 8. The more space is provided in the wraparound cavity 132, the more the formability is improved.

Furthermore, the periphery of the cathode side separator 14 is electrically insulated.

Figure 10:
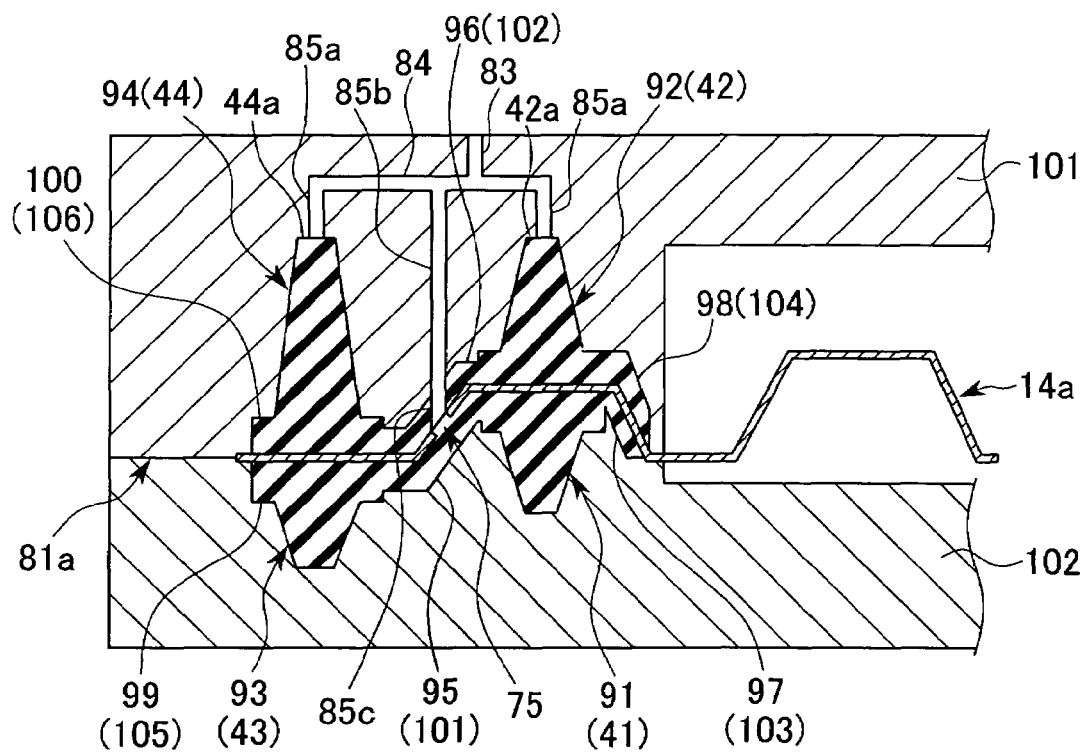
FIG. 10 is a partial cross-section of a second configuration of the metallic mold used in the first embodiment of the present invention.
Figure 13:
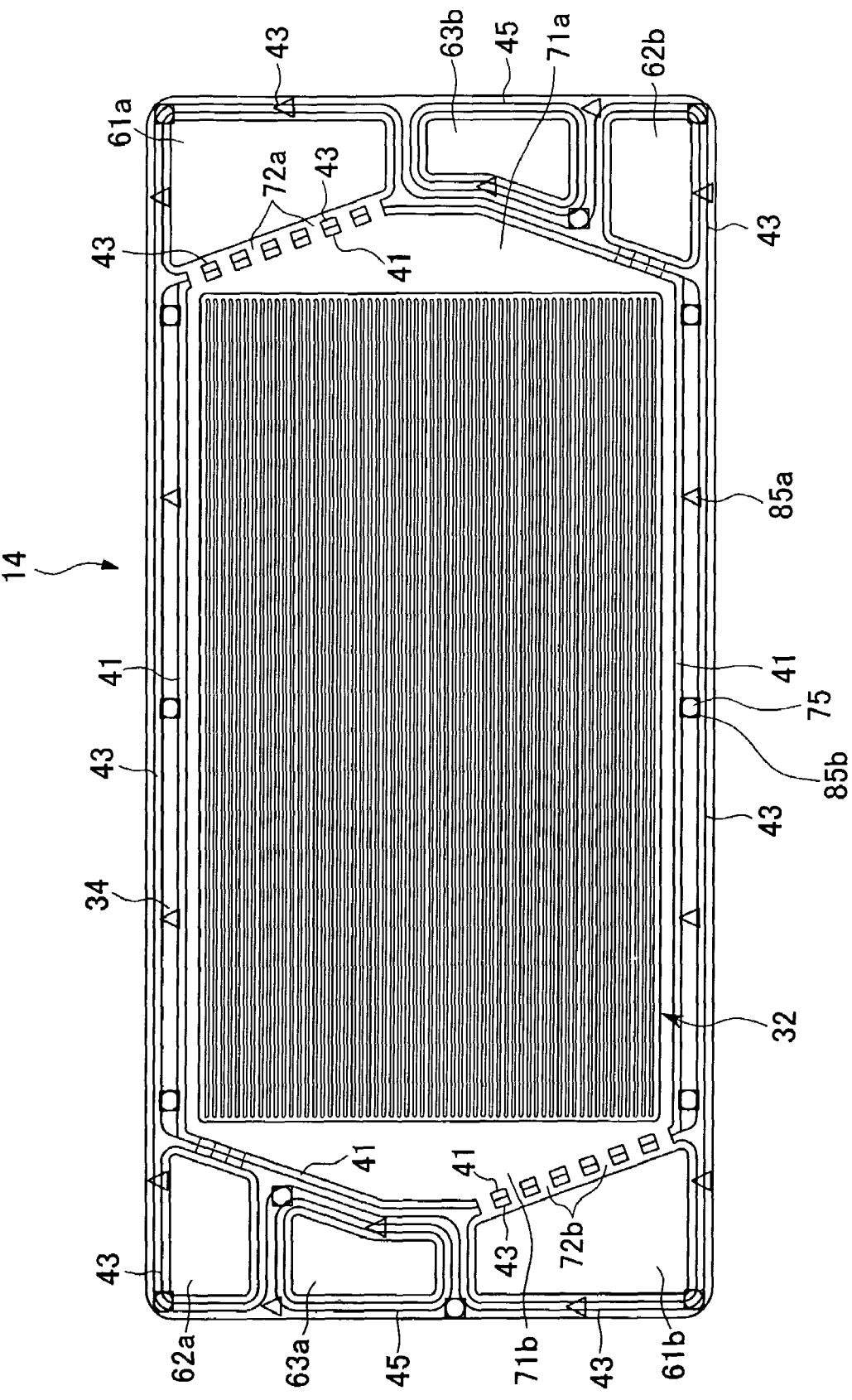
FIG. 13 schematically shows the locations of the gates and the through holes, when the mold shown in FIG. 10 is used, by overlaying them on a plan view of the cathode side separator.

Referring now to FIGS. 10 and 13 and primarily comparing the difference from FIG. 8, a third configuration of the injection mold used for fabricating the cathode side separator 14 will be explained.

In FIGS. 10 and 13, the same reference symbols are used for the same elements as in FIGS. 2 and 8.

In this configuration, a second gate branching from the runner 84 and extending to the through hole 75 is formed in the upper mold 101.

The second gate comprises: a gate 85b which branches from the runner 84, extends downwardly, and opens facing the through hole 75 positioned at the cavity-defining surface; and a guide portion 85c which extends from the open end of the gate 85b and connects the open end with the through hole 75.

FIG. 13 schematically shows the locations of the gates 85a (indicated by triangular symbols), the gates 85b (indicated by square symbols), and the through holes 75 (indicated by circular symbols) by overlaying them on a plan view of the cathode side separator 14.

In this configuration, the melted seal material is injected into the sprue 83 in the upper mold 101, and a portion of the melted seal material is supplied into the second groove 92, the fourth groove 94, the sixth groove, and the backup cavities 98 and 100 via the runner 84 and the gates 85a in the upper mold 101, and another portion of the melted seal material is directly supplied into the connecting cavity 95 formed on the front side of the separator body 14a via the runner 84 and the second gate, i.e, the gate 85b and the guide portion 85c.

A portion of the melted seal material supplied into the connecting cavity 95 flows into the first and third grooves 91 and 93, and the backup cavities 97 and 99.

The melted seal material is also supplied into the sixth groove through the gate (not shown) extending downwardly from the runner 84, and a portion of the melted seal material flows to the front side of the separator body 14a via the through hole 75, and flows into the fifth groove.

According to the method using the molds with the above structure, the melted seal material is directly supplied into the first and third grooves 41 and 43 formed in the lower mold 102, without passing through the second and fourth grooves 42 and 44 and the connecting cavity 96 formed in the upper mold 101.

Accordingly, the injection pressure in a single injection process can be reduced, and also the forming time may be reduced.

Similar to the configuration shown in FIG. 8, because the gate 85a is connected to the upper portions 42a and 44a of the grooves 92 and 94, which will form sealing surfaces of the seals, supplying the melted seal material to the sealing surface of the seal is ensured, and defects in the product due to an insufficient supply of the melted seal material to the sealing surface can be preferably prevented; thus, product reliability may be improved. Furthermore, because the length of the gate 85a may be shortened, waste of the melted seal material can be reduced.

Additionally, because the melted seal material is evenly supplied into each of the grooves 92 and 94 corresponding to the inner and outer seals from each of the gates 85a, the inner and outer seals 41 to 44 are uniformly formed; thus, product quality may be preferably improved. Furthermore, because the melted seal material is separately supplied into each of the grooves 92 and 94, the time for injection can be reduced, and because the flow path of the melted seal material is shortened, the forming time can be reduced.

The present invention is not limited to the foregoing embodiments and alternative embodiments are also possible; the physical values described above are merely examples which should not restrict the present invention.

Figure 11:
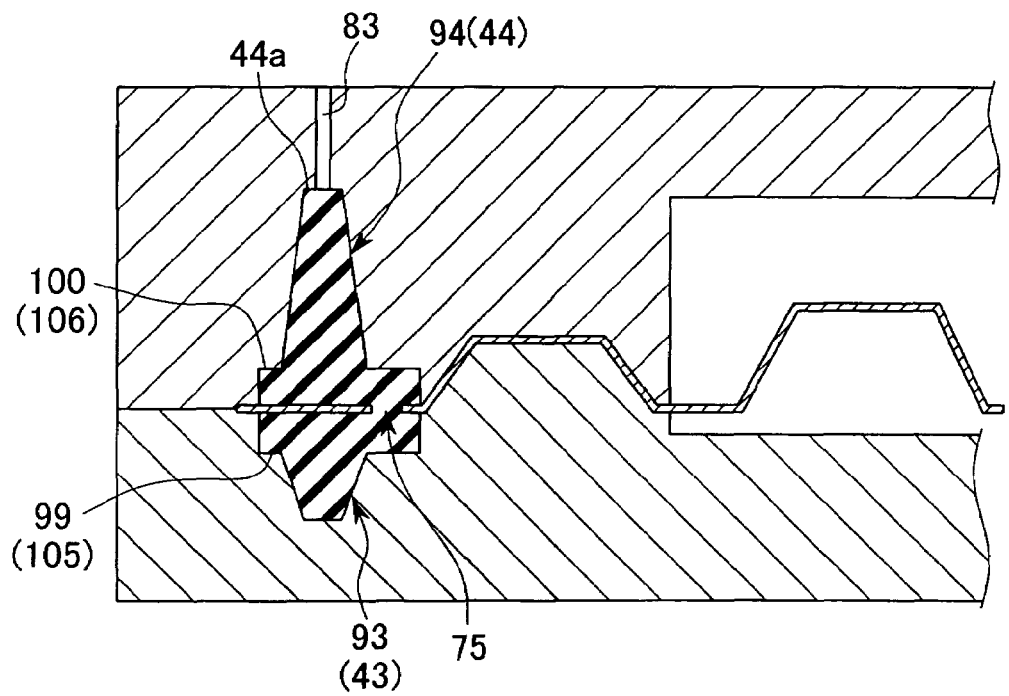
FIG. 11 is a partial cross-section of a first configuration of the metallic mold used in a second embodiment of the present invention.

For example, the foregoing methods for fabricating seal-integrated separators having a dual seal structure in which the third and fourth seals 43 and 44 are provided in addition to the first and second seals 41 and 42 are also applicable in fabricating seal-integrated separators having a single seal structure, as a second embodiment of the present invention shown in FIG. 11.

FIG. 11, corresponding to FIG. 8 showing the first embodiment, is a partial cross-section of a first configuration of the metallic mold used in the second embodiment of the present invention, and the same reference symbols are used for the same elements as in FIG. 8.

In the foregoing embodiments, the separator bodies 14a are made of stainless steel; however, these may also be made of other metals or carbon-containing materials.

Figure 14:
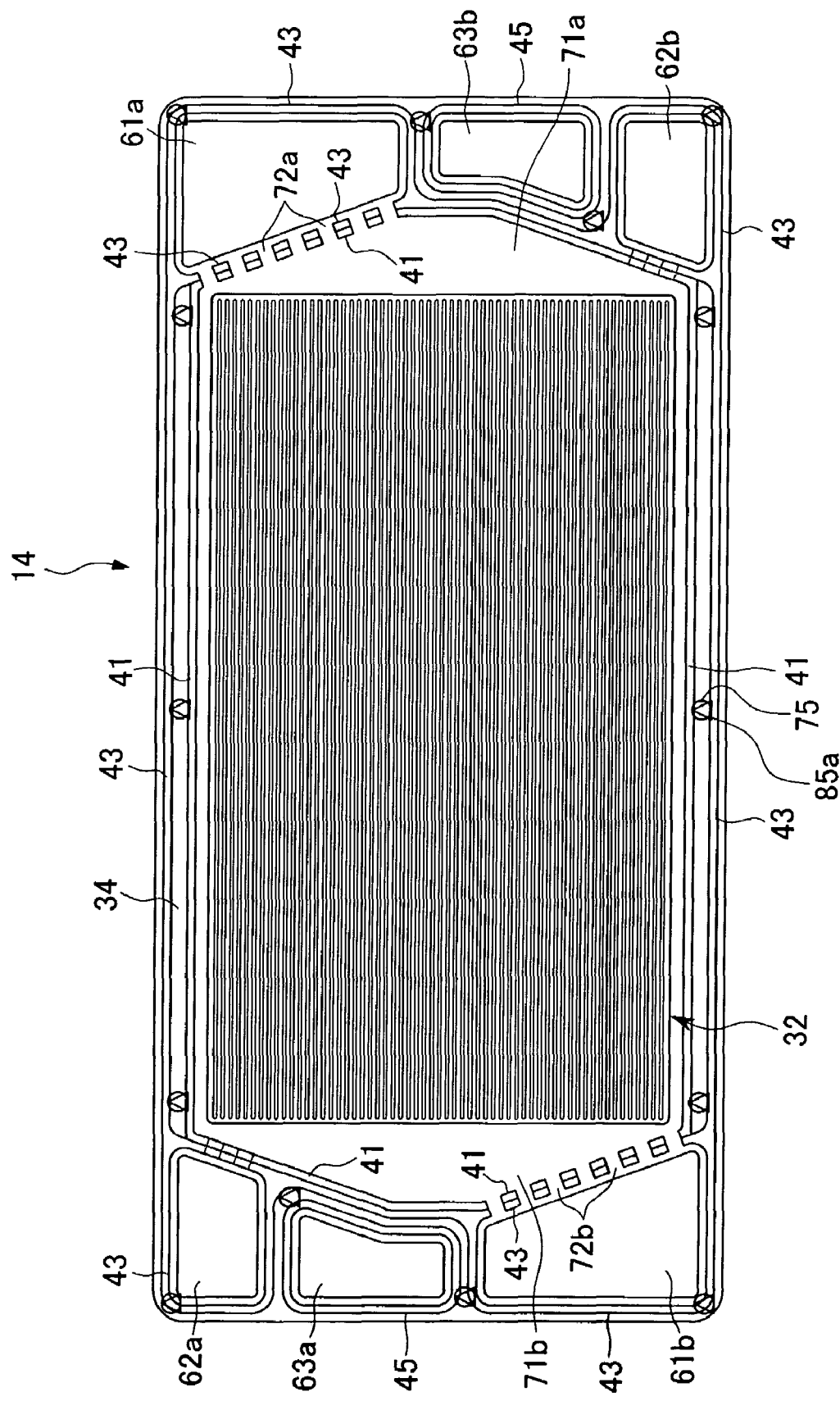
FIG. 14 schematically shows alternative locations of the gates and the through holes by overlaying them on a plan view of the cathode side separator.

Furthermore, the gates 85a and the through holes 75 are not necessarily disposed as shown in FIG. 12, but may be disposed as shown in FIG. 14.

In this configuration shown in FIG. 14, the gates 85a (indicated by triangular symbols) and the through holes 75 (indicated by circular symbols) are disposed so as to overlap each other in the plan view.

According to this configuration, the melted seal material flows along both sides of the separator body 14a simultaneously, and because the number of gates 85a may be reduced, waste of the melted seal material can be reduced.

Figure 15:
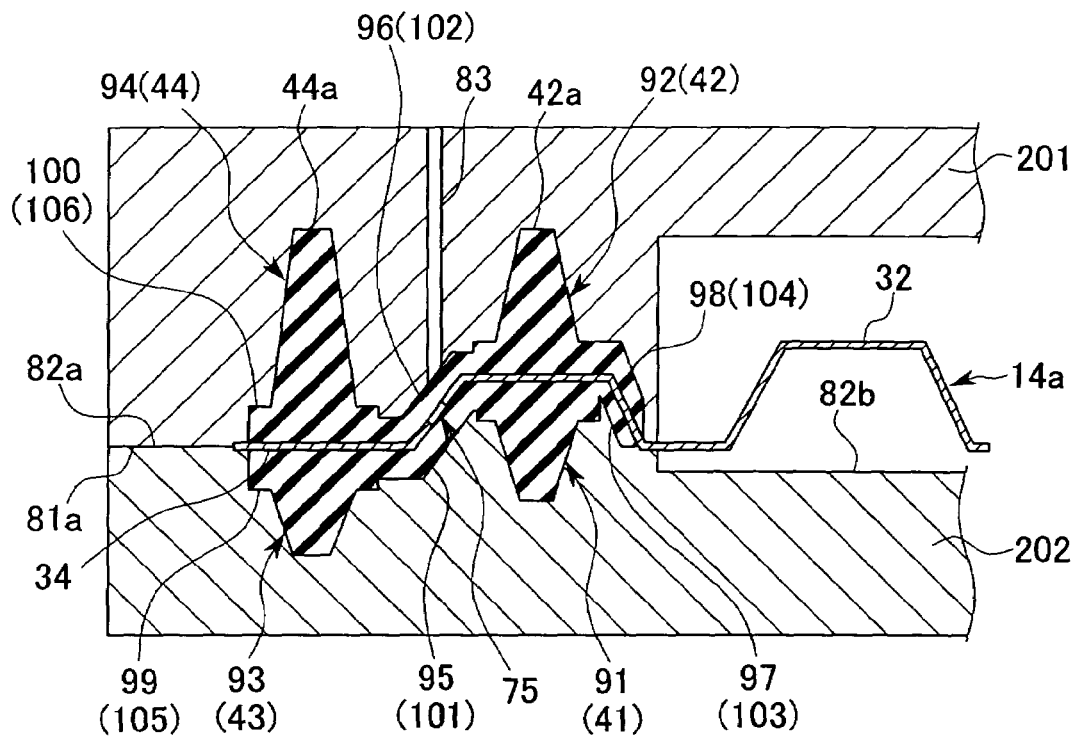
FIG. 15 is a partial cross-section of a first configuration of the metallic mold used in a third embodiment of the present invention.

FIG. 15, corresponding to FIG. 8 showing the first embodiment, is a partial cross-section of a first configuration of the metallic mold used in the third embodiment of the present invention, and the same reference symbols are used for the same elements as in FIG. 8.

In this configuration, the sprue 83 for guiding the melted seal material supplied from the outside is formed in an upper mold 201, and is connected to the connecting cavity 96 which connects the second groove 92 with the fourth groove 94.

According to the method using the molds with the above structure, because the melted seal material is evenly supplied into each of the grooves 91–94 while avoiding the sealing surfaces 41a, 42a, 43a, and 44a, uniform seals 41–45 can be formed. In addition, because the melted seal material is supplied to portions of the grooves corresponding to the portions of the seals 41–45 where a compressive force for sealing will not be applied during use, a sufficient sealing performance can be ensured. Furthermore, because the connecting cavity 96 is located between the grooves 91 and 93 or between the grooves 92 and 94, enlargement of the molds may be prevented; thus a relatively low production cost can be achieved, in contrast to the case in which the connecting cavity is located outside the grooves 91–94. This configuration is applicable to the embodiment shown in FIG. 10, in which the gate 85b is directly connected to the through hole 75.

Figure 16:
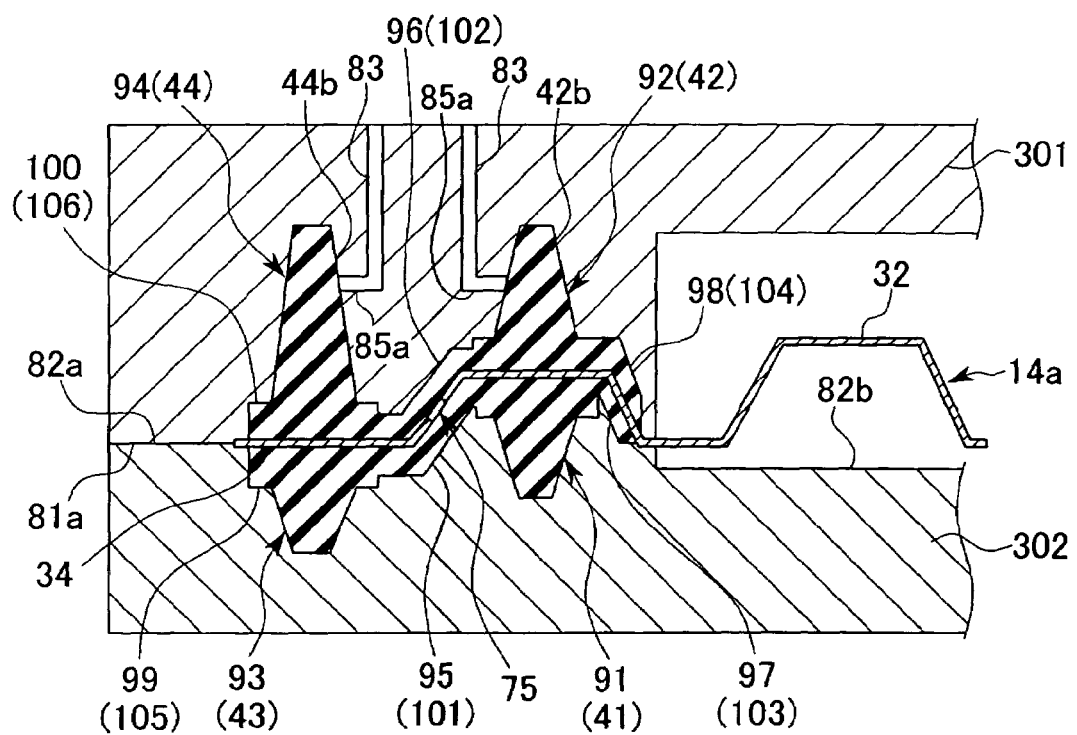
FIG. 16 is a partial cross-section of a second configuration of the metallic mold used in the third embodiment of the present invention.

FIG. 16, corresponding to FIG. 8 showing the first embodiment, is a partial cross-section of a second configuration of the metallic mold used in the third embodiment of the present invention, and the same reference symbols are used for the same elements as in FIG. 8.

In this configuration, two sprues 83 for guiding the melted seal material supplied from the outside of an upper mold 301 are respectively formed toward the second and fourth grooves 92 and 94, and the gates 85a extending from each of the sprues 83 are connected to the side portions 42b and 44b of the second and fourth grooves 92 and 94, i.e., are connected to the portions not forming the sealing surfaces 41a, 42a, 43a, and 44a. A lower mold 302 is not provided with a sprue 83.

According to the method using the molds with the above structure, supply marks of the melted seal material will be made on the side surfaces 42b and 44b of the second and fourth grooves 92 and 94; however, because supply marks which may degrade the sealing performance will not be made on the sealing surfaces 41a, 42a, 43a, and 44a of the seals 41–45, the sealing performance may be improved, which means that improved product quality can be achieved. In addition, because surface finishing of the sealing surfaces of the seals need not be performed, a relatively low production cost can be achieved. This configuration is applicable to the embodiment shown in FIG. 10, in which the gate 85b is directly connected to the through hole 75.

Figure 17:
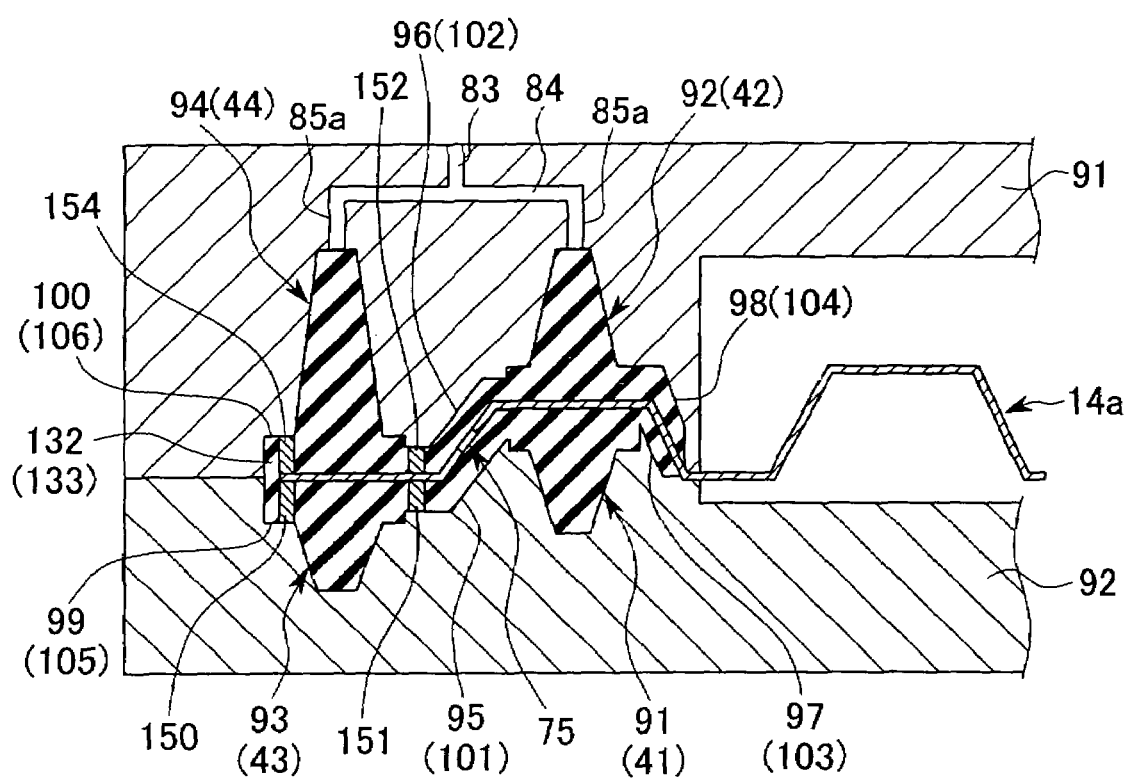
FIG. 17 is a partial cross-section of a first configuration of the metallic mold used in a fourth embodiment of the present invention.
Figure 18:
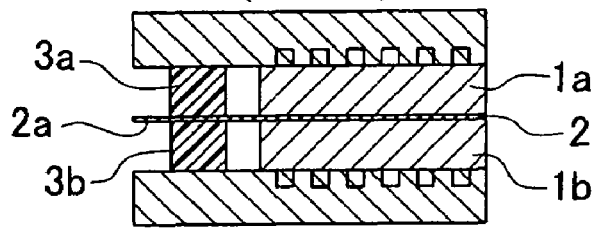
FIG. 18 is a partial cross-section showing the major portion of a fuel cell in the prior art, in which seals are symmetrically disposed so as to sandwich a solid polymer electrolyte membrane.
Figure 19:
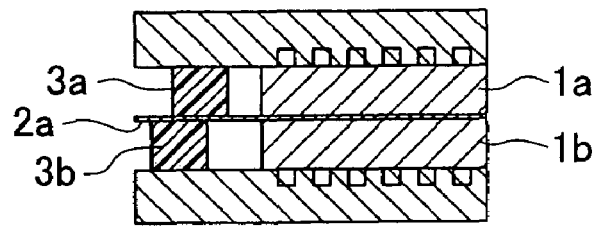
FIG. 19 is a partial cross-section showing the major portion of a fuel cell in the prior art, in which seals are disposed with a slight lateral offset with respect to each other and sandwich the solid polymer electrolyte membrane.
Figure 20:
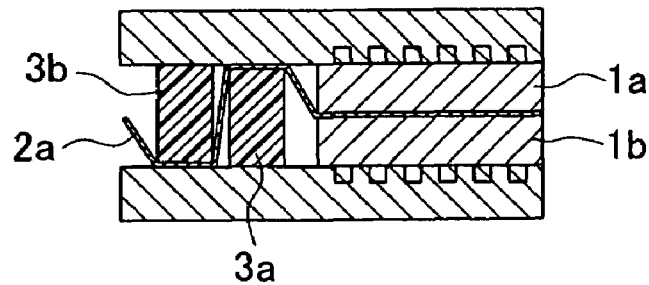
FIG. 20 is a partial cross-section showing the major portion of a fuel cell in the prior art, in which an outer seal and an inner seal are disposed side by side so as to hold a portion of the solid polymer electrolyte membrane therebetween.
Figure 21:
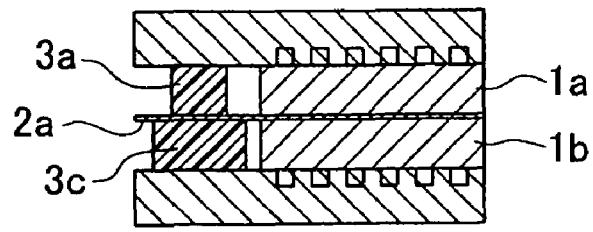
FIG. 21 is a partial cross-section showing the major portion of a fuel cell in the prior art, in which one seal is made wider than the other seal and they are disposed so as to sandwich the solid polymer electrolyte membrane.

FIG. 17, corresponding to FIG. 9 showing the first embodiment, is a partial cross-section of a first configuration of the metallic mold used in the fourth embodiment of the present invention, and the same reference symbols are used for the same elements as in FIG. 9.

In this configuration, at least one side of the separator body 14a is supported by support fixtures. As shown in FIG. 17, support fixtures 151–154 are interposed near the third groove 93 and the fourth groove 94, and outside the through hole 75 of the separator body 14a. More specifically, the support fixtures 151 and 152 are interposed between the boundary portion, which is located between the connecting cavities 95 and 96 and the grooves 93 and 94, and the separator body 14a, and support the separator body 14a. The support fixtures 153 and 154 are interposed between the boundary portion, which is located between the wraparound cavity 132 and the grooves 93 and 94, and the separator body 14a, and support the separator body 14a. The support fixtures may be disposed on only one side of the separator body 14a when the separator body 14a can be sufficiently supported so as not to be deformed by the injection pressure of the melted seal material.

According to the method using the molds with the above structure, deformation of the separator body 14a due to the injection pressure can be preferably prevented by the support fixtures 151–154 when the melted seal material flows into the grooves 91–94 via the through hole 75; thus, accuracy of the product can be improved. This configuration using the support fixtures 151–154 is applicable to the embodiment shown in FIGS. 8 and 10.

It is obvious from the foregoing description that the present invention will provide the following advantageous effects.

(1) According to the first aspect of the present invention, since the seals are simultaneously integrated on both sides of the separator body, the seal-integrated separator can be fabricated through a single process, the seals can be accurately positioned, and the assembling time of the fuel cell units is greatly reduced, in contrast to the cases in which seals which are not integrated on the separator are positioned relative to both sides of the separator body or a paste of the seal material is coated onto the separator; thus, fuel cell units with a superior sealing performance can be fabricated at low cost.

(2) In addition, because the seals can be accurately positioned, stresses in the seals are evenly distributed when the separators are stacked. Furthermore, because the first and second grooves communicate with each other via the through hole, the seal forming pressures applied to both sides of the separator body are equalized to each other when the injection of the melted seal material is completed; thus, deformation in the separator due to uneven seal forming pressures can be preferably prevented.

(3) Additionally, because the through hole is not in the position on the separator body where the seals are to be formed, the compressive force for sealing is not affected by the through hole during use; thus, a local pressure reduction in sealing is preferably prevented. Furthermore, because the through hole is positioned near the grooves, the injection pressure in a single injection process can be reduced, and also the forming time may be reduced.

(4) According to the second aspect of the present invention, in addition to the advantageous effects obtainable through the first aspect, because the melted seal material is evenly supplied into each of the grooves corresponding to the inner and outer seals, the inner and outer seals are uniformly formed; thus, product quality may be preferably improved. In addition, because the melted seal material is separately supplied into each of the grooves, the time for injection can be reduced, and because the flow path of the melted seal material is shortened, the forming time can be reduced.

(5) According to the third aspect of the present invention, in addition to the advantageous effects obtainable through the second aspect, supplying the melted seal material to the sealing surface of the seal is ensured, and defects in the product due to an insufficient supply of the melted seal material to the sealing surface can be preferably prevented; thus, product reliability may be improved. In addition, because the length of the first gate may be shortened, waste of the melted seal material can be reduced.

(6) According to the fourth aspect of the present invention, in addition to the advantageous effects obtainable through the second aspect, a supply mark which may degrade the sealing performance will not be made on the sealing surface, which means that improved product quality can be achieved. In addition, because surface finishing of the sealing surface of the seal need not be performed, a relatively low production cost can be achieved.

(7) According to the fifth aspect of the present invention, in addition to the advantageous effects obtainable through the first aspect, because the melted seal material is supplied into each of the grooves while avoiding the sealing surface, uniform seals can be formed. In addition, because the melted seal material is supplied to portions of the grooves corresponding to the portions of the seals where a compressive force for sealing will not be applied during use, a sufficient sealing performance can be ensured. Furthermore, because the connecting cavity is located between the grooves, enlargement of the molds may be prevented; thus a relatively low production cost can be achieved, in contrast to the case in which the connecting cavity is located outside the grooves.

(8) According to the sixth aspect of the present invention, in addition to the advantageous effects obtainable through the first aspect, the injection pressure in the grooves in each of the molds may be reduced; thus, the formability of the seals can be improved.

(9) According to the seventh aspect of the present invention, in addition to the advantageous effects obtainable through the first aspect, deformation of the separator body due to the injection pressure can be preferably prevented when the melted seal material flows through the through hole; thus, accuracy of the product can be improved.

(10) According to the eighth aspect of the present invention, in addition to the advantageous effects obtainable through the first aspect, because the melted seal material is directly supplied to the grooves in each of the molds, i.e., the melted seal material is supplied into the groove in the second mold without passing through the groove in the first mold, the injection pressure in a single injection process can be reduced, and also the forming time may be reduced.

(11) According to the ninth aspect of the present invention, in addition to the advantageous effects obtainable through the eighth aspect, because the through hole is not in the position on the separator body where the seals are to be formed, the compressive force for sealing is not affected by the through hole during use; thus, a local pressure reduction in sealing is preferably prevented. In addition, because the through hole is positioned near the grooves, the injection pressure in a so-called single injection process, i.e., a process in which an injection material is injected into only one of the two mating molds, can be reduced, and also the forming time may be reduced.

(12) According to the tenth aspect of the present invention, in addition to the advantageous effects obtainable through the ninth aspect, because the melted seal material is evenly supplied into each of the grooves corresponding to the inner and outer seals, the inner and outer seals are uniformly formed; thus, product quality may be preferably improved. In addition, because the melted seal material is separately supplied into each of the grooves, the time for injection can be reduced, and because the flow path of the melted seal material is shortened, the forming time can be reduced.

(13) According to the eleventh aspect of the present invention, in addition to the advantageous effects obtainable through the tenth aspect, supplying the melted seal material to the sealing surface of the seal is ensured, and defects in the product due to an insufficient supply of the melted seal material to the sealing surface can be preferably prevented; thus, product reliability may be improved. In addition, because the length of the first gate may be shortened, waste of the melted seal material can be reduced.

(14) According to the twelfth aspect of the present invention, in addition to the advantageous effects obtainable through the tenth aspect, a supply mark which may degrade the sealing performance will not be made on the sealing surface, which means that improved product quality can be achieved. In addition, because surface finishing of the sealing surface of the seal need not be performed, a relatively low production cost can be achieved.

(15) According to the thirteenth aspect of the present invention, in addition to the advantageous effects obtainable through the ninth aspect, deformation of the separator body due to the injection pressure can be preferably prevented when the melted seal material flows through the through hole; thus, accuracy of the product can be improved.

What is claimed is:

1. A method for fabricating a seal-integrated separator for a fuel cell, said seal-integrated separator including a separator body and an inner seal and an outer seal which are integrated on both sides of said separator body and which are disposed, on the same surface of said separator body and side by side, around an electrode's reaction surface during use, comprising the steps of:

forming a through hole in said separator body;

providing a first mold having grooves respectively positioned corresponding to said inner and outer seals disposed on one side of said separator body, a connecting cavity for forming a seal bridge at least partially connecting said inner and outer seals to each other at a position corresponding to said through hole, a first gate communicating with each of said grooves, and a second gate separately formed from said first gate so as to directly communicate with said through hole, and a second mold having grooves respectively positioned corresponding to said inner and outer seals disposed on the other side of said separator body, and a connecting cavity for forming a seal bridge at least partially connecting said inner and outer seals to each other at a position corresponding to said through hole;

holding said separator body between said first mold and said second mold and making said second gate directly communicate with said through hole; and injecting melted seal material to form said seals into said connecting cavity and into each of said grooves in said first mold by supplying said melted seal material into said first gate, and injecting said melted seal material into said connecting cavity and into each of said grooves in said second mold via said through hole by supplying said melted seal material into said second gate.

2. A method according to claim 1, wherein said melted seal material is separately supplied into each of said grooves corresponding to said inner and outer seals.

3. A method according to claim 2, wherein said first gate is connected to a portion of each of said grooves, said portion forming a sealing surface of said seal.

4. A method according to claim 2, wherein said first gate is connected to a portion of each of said grooves, said portion not forming a sealing surface of said seal.

5. A method according to claim 1, wherein said step of holding said separator body between said first mold and said second mold includes supporting at least one side of said separator body by a support fixture.

* * * * *